United States Patent [19]

Singer et al.

[11] Patent Number: 4,819,426
[45] Date of Patent: Apr. 11, 1989

[54] ROCKET PROPELLED VEHICLE FORWARD END CONTROL METHOD AND APPARATUS

[75] Inventors: Victor Singer; Barry E. Kerrigan, both of Newark, Del.

[73] Assignee: Morton Thiokol, Inc., Chicago, Ill.

[21] Appl. No.: 47,760

[22] Filed: May 8, 1987

[51] Int. Cl.$^4$ .............................................. F02K 9/06
[52] U.S. Cl. ....................................... 60/250; 60/254
[58] Field of Search ................ 60/253, 254, 250, 263; 102/286, 287, 289, 291

[56] References Cited

U.S. PATENT DOCUMENTS

| | | | |
|---|---|---|---|
| 2,724,237 | 11/1955 | Hickman | 60/250 |
| 2,945,442 | 7/1960 | Adelman et al. | 102/378 |
| 3,044,255 | 7/1962 | Precoul | 60/253 |
| 3,349,564 | 10/1967 | Schwartz et al. | 60/253 |
| 3,380,251 | 4/1968 | Wall | 60/253 |
| 3,724,217 | 4/1973 | McDonald | 60/254 |
| 3,826,087 | 7/1974 | McDonald | 60/200 |
| 4,550,888 | 11/1985 | Douglass et al. | 244/3.22 |

OTHER PUBLICATIONS

Newman, R. S. "Why Not Dual Thrust Engines", *Astronautics* Mar. 1958 pp. 26–27.

Primary Examiner—Louis J. Casaregola
Assistant Examiner—Timothy S. Thorpe
Attorney, Agent, or Firm—Gerald K. White

[57] ABSTRACT

A rocket propelled vehicle includes a lower stage solid propellant rocket motor and at least one upper stage solid propellant rocket motor. Each of the rocket motors includes a case, a nozzle and a solid propellant having a central combustion chamber, with the case of the lower stage motor, in a preferred embodiment, being open at the forward end and the case of the upper stage motor being open at the aft end and forming a continuation of the open end of the lower stage case, with a layer of slow burning material cast on the surface defining the central combustion chamber of the upper stage solid propellant, and with ignition of all stages being accomplished approximately simultaneously through operation of a single ignition system. Pressurization of the lower and upper stages during burning of the lower stage propellant counteracts and substantially eliminates compressive stresses in the upper stage vessel membranes, which compressive stresses are induced by transmission of lower stage thrust to the upper stages and the payload beyond by superimposing tensile stresses therein, and additionally provides a source for the secondary discharge of gases. Such gaseous discharge may be used to create a boundary layer surrounding the skin of the vehicle for diminishing friction with the medium through which the vehicle flies, and may also be used for thrust vector control to steer the vehicle.

13 Claims, 2 Drawing Sheets

ROCKET PROPELLED VEHICLE FORWARD END CONTROL METHOD AND APPARATUS

BACKGROUND OF THE INVENTION

1. Field of the Invention

The present invention relates to improvements in multi-stage rocket motors having utility for powered flight in air, beyond the atmosphere, or in hydrospace.

2. Description of the Prior Art

Proposals have been made in the prior art for increasing the useful energy of multi-stage rocket motors to the end that they may have greater range or greater capability in boosting heavy payloads. One proposal that has been made, as described in U.S. Pat. No. 3,301,184 granted Jan. 31, 1967 to F. K. Reinstein et al., is to eliminate that portion of the lower or first stage rocket motor case that would normally complete the pressure vessel at the forward end thereof. Specifically, the forward end of the first stage case is made substantially continuous in form with the nozzle of the second stage. The second stage is totally loaded with propellant, even into the nozzle associated therewith, so that the propellant is continuous from the forward end of the first stage into the second stage. The second stage of the motor is automatically ignited by terminal combustion of the first stage. Also, the stage separation mechanism that is provided is arranged such that stage separation is automatically effected after ignition of the second stage has taken place. With this arrangement, a considerable saving in weight of inert parts is said to be realizable. In particular, the weight of the forward end of the first stage case is eliminated, the ignition device for the second stage is eliminated, and the weight of the electrical equipment associated with ignition of the second stage is eliminated.

As described in U.S. Pat. No. 3,301,184, however, there are certain disadvantages to this prior art rocket motor arrangement due primarily to the fact that solid propellants do not have sufficient structural strength to contain the operating pressure of the first stage without some reinforcement. Pressure created by the combustion of the first stage is transmitted to the second stage. This causes the second stage case to enlarge and permit cracking of the propellant or extrusion of burning propellant from the first stage into the second stage prematurely. This may cause malfunction of the rocket motor in several ways. Specifically, (a) the thrust of the first stage may become erratic as a result of the burning surface thereof being deformed, (b) cracking of the second stage propellant may cause the stage to explode because of the greatly increased burning surface, and-/or (c) the second stage may ignite prematurely. It is further stated that this kind of rocket eliminates the possibility that the second stage may be anything but 100% loaded with solid propellant, thus precluding a solid propellant rocket motor having a central combustion chamber for the second stage.

In order to overcome the above-mentioned disadvantages, U.S. Pat. No. 3,301,184 teaches the use of a lightweight pressure barrier, with a built-in explosive fuse, fitted in the forward end of the first stage case with none of the second stage propellant extending into the nozzle associated therewith. This is said to make possible all of the savings in weight of the rocket motor, as above described, and in addition permits use of a solid propellant rocket motor having a central combustion chamber for the second stage.

It has been found, however, that such an arrangement, as described in U.S. Pat. No. 3,301,184, is subject to a disadvantage that makes the rocket unsuitable particularly for large thrust applications. This disadvantage stems from the second or upper stage propellant having insufficient strength to withstand without deformation the compressive stresses to which it is subjected when large thrusts are produced by the associated first or lower stage. In order to enable the second or upper stage propellant to withstand such compressive stresses, the practice of the prior art has been to increase the thickness of the wall of the case containing the second and upper stage propellant, and consequently, the weight of the rocket. This detracts from the useful energy of the rocket.

Thus, there exists a need and a demand for further improvement in the method of and apparatus employed for increasing the useful energy of multi-stage rockets. The present invention was devised to fill the technological gap that has existed in the art in this respect.

SUMMARY OF THE INVENTION

An object of the invention is to provide an improved method of and apparatus for so controlling the operation of a multi-stage rocket propelled vehicle as to enable a reduction in weight of the rocket while achieving an increase in the useful energy available therefrom.

Another object of the invention is to provide such an improved method of and apparatus in respect of a multi-stage rocket propelled vehicle wherein each of first or lower and second or upper stages connected in tandem comprise a rocket motor having a solid propellant with a central perforation therein, with the case in the second stage having less capacity to withstand buckling than required by the thrust forces to which it is subjected, during the operation of the first stage.

A further object of the invention is to provide such an improved method of and apparatus wherein each of the first and second stages of the rocket propelled vehicle have a central combustion chamber and ignition of both stages is accomplished approximately simultaneously through operation of a single ignition system, and wherein the second stage propellant is caused initially to burn at a rate that is significantly slower than the rate at which the first stage solid propellant burns until the burning of the latter has been substantially completed thereby to pressurize the central combustion chamber of the second stage, which pressurization is effective to impart structural strength to the case containing the second stage solid propellant by placing it in under tension in the direction of the thrust forces produced by the first stage during burning thereof. This enables a reduction in the wall thickness, and hence, the weight, of the case containing the second stage solid propellant while counteracting and eliminating any tendency for the case to buckle during burning of the first stage solid propellant because compressive stresses in the case are eliminated or substantially reduced.

Still another object of the invention is to provide an improved subsystem for the secondary discharge of gases generated during powered flight of a multi-stage rocket-propelled vehicle for either of two secondary uses or both in appropriate combination, one such purpose involving the creation of a boundary layer surrounding the outer skin of the casing of the vehicle to diminish friction through the medium through which the vehicle flies, and the other such purpose being thrust vector control for steering the vehicle.

In accomplishing these and other objectives of the invention, there is provided in one embodiment thereof a propulsion system for a multi-stage rocket-propelled vehicle comprising a first or lower stage having a first center perforated solid propellant and a first case with the first solid propellant having an aft end with the case being open at the forward end of the first solid propellant. The propulsion system further includes at least one second or upper stage having a second center perforated solid propellant and a second case open at the aft end of the second solid propellant and including thereat a nozzle that is substantially continuous in form with the forward end of the case of the first stage. A layer of a slow burning material is provided on the surface of the second solid propellant. Ignition of the first and second stages is accomplished approximately simultaneously through operation of a single ignition system. The burn rate and the thickness of the layer of solid propellant on the second stage solid propellant are so arranged that, upon operation of the ignition system, burning of the layer of material lasts through substantially the entire burn of the first stage solid propellant. Such burning must be substantially completed before the surface of the second propellant is exposed for combustion. As a result, the central combustion chamber of the second stage solid propellant defined by the perforation therein is pressurized and provides a source for the secondary discharge of gas. Additionally, such pressurization imposes tensile stresses on the wall of the second case in the direction of the thrust produced by the first or lower stages, specifically, along the longitudinal axis of the rocket, thus counteracting the compressive stresses and effectively imparts structural strength to the case and propellant contained therein. This enables a reduction to be made in the wall thickness and, hence, weight of the second case and a corresponding enhancement of the useful energy of the rocket.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with reference being made to the accompanying figures of drawing which form part of the specification and of which.

DESCRIPTION OF THE PREFERRED EMBODIMENT

Figure 1:
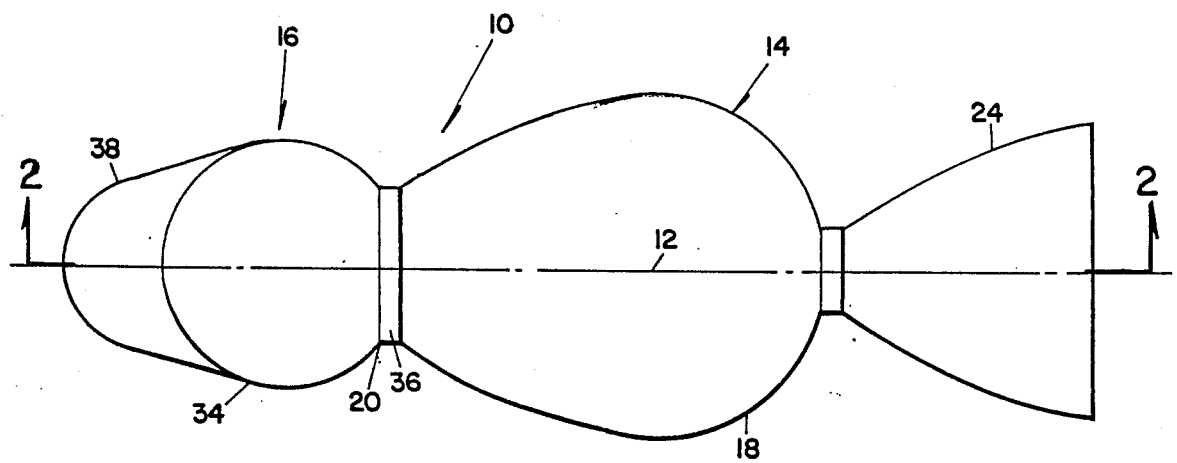
FIG. 1 is a perspective view of a rocket according to the present invention.
Figure 2:
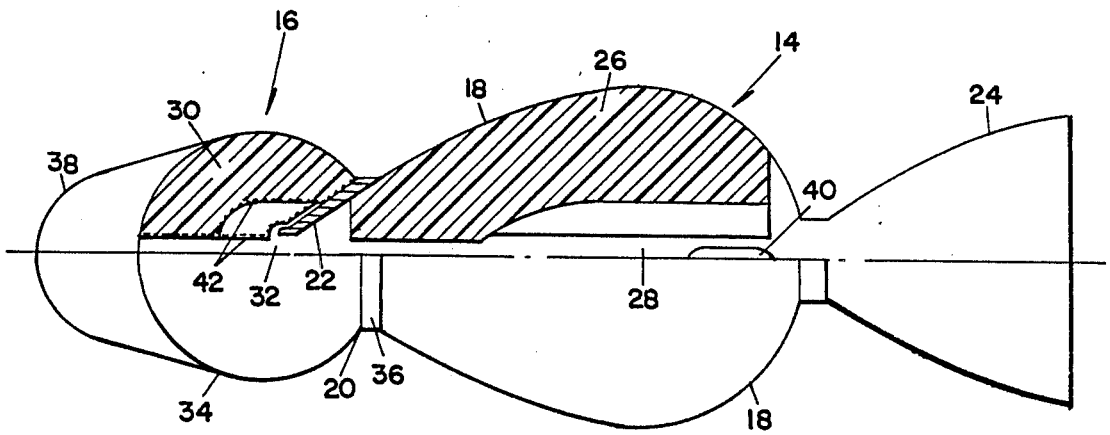
FIG. 2 is a cross sectional view taken along the lines 2—2 of FIG. 1 showing the rocket as embodying a stage-and-a-half propulsion system with the nozzle of the half stage submerged.

In the embodiment of the invention illustrated in FIGS. 1 and 2, a vehicle or rocket propelled vehicle 10 having a longitudinal axis 12 comprises a solid propellant first stage rocket motor 14 that is attached to a second or upper stage solid propellant rocket motor 16 that is positioned forward of motor 14. The first stage motor 14 is larger than the second stage rocket motor 16 and comprises a case 18 that is open at the forward end 20 and substantially continuous in form with a nozzle 22 of the second stage motor 16.

The first stage motor 14 includes a nozzle 24 and a solid propellant grain 26 having a center perforation forming a central combustion chamber 28. Similarly, the second stage motor 16 includes a solid propellant grain 30 having a center perforation forming a central combustion chamber 32. The propellant grain 26 is a high burn rate propellant. The second stage propellant grain 30 is also a high burn rate propellant.

The first stage nozzle 24 and the second stage nozzle 22 may each be of the converging-diverging type, as shown. The second stage nozzle 22 is shown as being submerged, that is, a portion thereof is positioned in the propellant grain 30 of the second stage.

The outer skin of the first stage case 18 covers the second stage nozzle 22 and terminates at the outer periphery of a case 34 of the second stage motor 16. A stage separation device 36, for example, a flex charge, is fitted near the forward end of the first stage case 18. Attached to the forward end of the second stage case 34 is a forward dome 38.

Ignition of both of the first and second stage rocket motors 14 and 16 is accomplished approximately simultaneously through operation of a single ignition subsystem indicated by reference numeral 40. The ignition subsystem may include a launcher-retained device, not shown.

A feature of the invention is that the entire exposed surface of solid propellant grain 30 in the second stage motor 16 is covered by a layer 42 of slow burning rate material that is provided on the surface thus defining the central combustion chamber 32. Layer 42 must substantially burn away before the fast burning rate propellant grain 30 is exposed for combustion. The thickness of the layer 42 and the composition of the material comprising it are so arranged that, upon operation of the single ignition subsystem 40, burning thereof lasts through substantially the entire burn of the first stage propellant grain 26.

Gases generated by the burning of propellant grain 26 and propellant layer 42 pressurizes both central combustion chambers 28 and 32, which pressurization introduces tensile stresses in the membranes of the walls of cases 18 and 34 in the direction of the longitudinal axis 12 of rocket 10 in addition to generating a gaseous flow through nozzle 24 for providing a desired first or lower stage rocket thrust. Upon the completion of the burn of the propellant 26, the stage separation device 36 is actuated to separate the first stage motor 14 from the second stage motor 16 and thus eject the first stage motor 14 from the rocket 10.

In the continued operation of the rocket 10, hot gases in the central combustion chamber 32 ignite the then exposed surface of the propellant grain 32 to maintain pressurization of the central combustion chamber 32. Such pressurization maintains tensile stresses in the membranes of the wall of case 34 and causes a flow of generated gases through the nozzle 22 to provide a desired second stage rocket thrust.

Advantages of this arrangement include weight reductions of two kinds: first, the need for an ignition system for the second or upper stage rocket motor 16 is eliminated; and second, large compressive stresses in the membrane of the second stage case 34, induced by transmission of first stage thrust to the payload beyond, are eliminated by the superimposed tensile stresses produced by pressurization of both of the stages, that is, of both of the central combustion chambers 28 and 32, with a resulting decrease of necessary thickness of the membranes forming the walls of the rocket motor cases 18 and 34. It is noted that the gases generated by burning of the layer 42 are of only incidental importance to operation of the first stage rocket motor 14. The presence of the slow burning propellant material 42 is of significant importance, however, because of weight reductions described.

Figure 3:
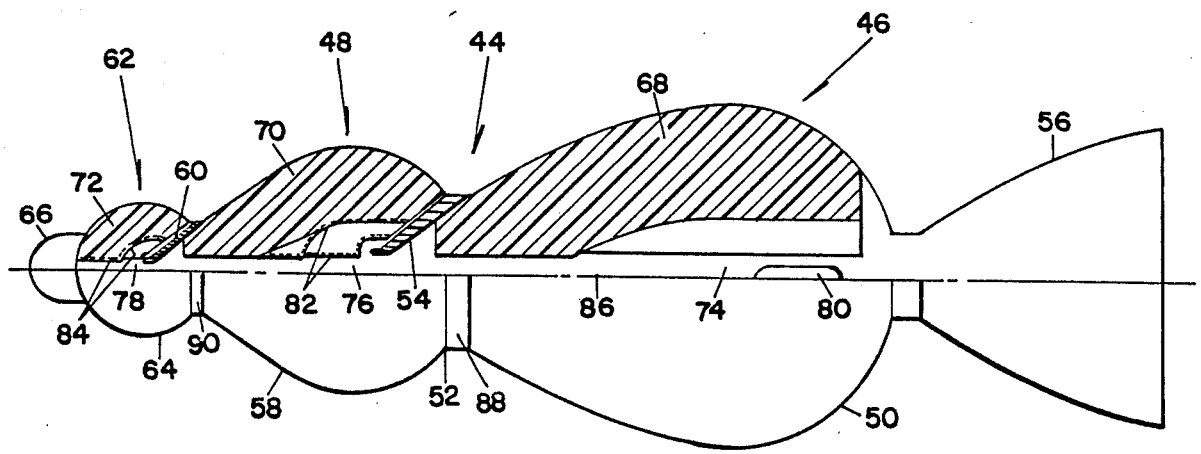
FIG. 3 is a cross sectional view of another embodiment of the invention incorporating a stage-and-two-halves rocket propulsion system with the nozzles of each of the two half stages being submerged.

In FIG. 3 there is illustrated another rocket embodiment of the invention involving a stage-and-two-halves rocket propulsion system. This embodiment comprises a rocket 44 including a solid propellant first stage rocket motor 46 that may be identical to the first stage rocket motor 14 of FIGS. 1 and 2 and which is attached to a second or upper stage solid propellant rocket motor 48. The first stage rocket motor 46 includes a case 50 that is open at the forward end 52 thereof and is substantially continuous in form with a submerged nozzle 54 of the second stage rocket motor 48. A nozzle 56 is provided at the aft end of case 50. Similarly, the second stage rocket motor 48 includes a case 58 that is open at the forward end thereof and is substantially continuous in form with a submerged nozzle 60 of a third stage rocket motor 62 that includes a case 64. Attached to the forward end of the case 64 is a forward dome 66.

Each of the rocket motors 46, 48 and 62 includes a center perforated solid propellant grain forming a central combustion chamber. Specifically, the motors 46, 48 and 62 include a respectively associated solid propellant grain 68, 70 and 72. Formed in propellant grains 68, 70 and 72 are respectively associated central combustion chambers 74, 76, and 78.

The outer skin of the first stage case 50 covers the second stage nozzle 54 and terminates at the outer periphery of the second stage case 58. Similarly, the outer skin of the second stage case 58 covers the third stage nozzle 60 and terminates at the outer periphery of the third stage case 64. Stage separation devices are fitted into the forward ends of each of the first and second cases 50 and 58, respectively.

Ignition of all of the first, second and third stage rocket motors 46, 48 and 62, as in the invention embodiment of FIGS. 1 and 2, is accomplished approximately simultaneously through operation of a single ignition subsystem indicated by reference numeral 80 which may include a launcher-retained device, not shown.

In the embodiment of FIG. 3, the propellant grains 68 of motor 46 are high burning rate. The second and third stage propellant grains 70 and 72 are also high burning rate propellants.

In the invention embodiment of FIG. 3, the second stage propellant grain 70 is covered by a layer 82 of slow burning rate material provided on the surface thus defining the central combustion chamber 76. Similarly, the third stage propellant grain 72 is covered by a layer 84 of slow burning rate material provided on the surface thus defining the central combustion chamber 78. As in the invention embodiment of FIGS. 1 and 2, the thickness and the composition of the material comprising layer 82 is so arranged that, upon operation of the single ignition subsystem 80, burning of the layer 82 lasts through substantially the entire burn of the first stage propellant grain 68 of motor 46 and delays for such time exposure for combustion of the surface of the second stage propellant grain 70 of motor 48. Similarly, the thickness and the composition of the material comprising layer 84 is so arranged that burning thereof lasts through substantially the entire burn of the first and second stage propellant grains 68 and 70 and delays for such time exposure for combustion of the surface of the third stage propellant grain 72.

Gases generated by burning of propellant grain 68 and propellant layers 82 and 84 pressurizes all three central combustion chambers 74, 76 and 78. Such pressurization may be used as a source for secondary discharges and also introduces tensile stresses in the membranes of the walls of all of the cases 50, 58 and 64 in the direction of the longitudinal axis 86 of rocket 44. Further, flow of such gases through the nozzle 56 produce the desired first stage thrust. Upon the completion of the burn of the propellant grain 68, a stage separation device 88 is actuated for ejecting the first stage motor 46 from the rocket 44.

Hot gases in the central combustion chamber 76 ignite the then exposed surface of the propellant grain 70. The resulting generated gases maintain pressurization of the central combustion chambers 76 and 78 and tensile stresses in the membranes of the walls of cases 58 and 64. Also, the flow of such gases through the nozzle 54 produce a desired second stage rocket thrust. Upon the completion of the burn of the propellant grain 70, a stage separation device 90 is actuated to eject the second stage motor 48 from rocket 44.

In the continued operation of the rocket 44, hot gases in the central combustion chamber 78 ignite the then exposed surface of the propellant grain 72 to maintain the pressurization of the central combustion chamber 78. Such pressurization maintains tensile stresses in the membranes of the walls of case 64 and causes a flow of generated gases through the nozzle 60 to provide a desired third stage rocket thrust.

Figure 4:
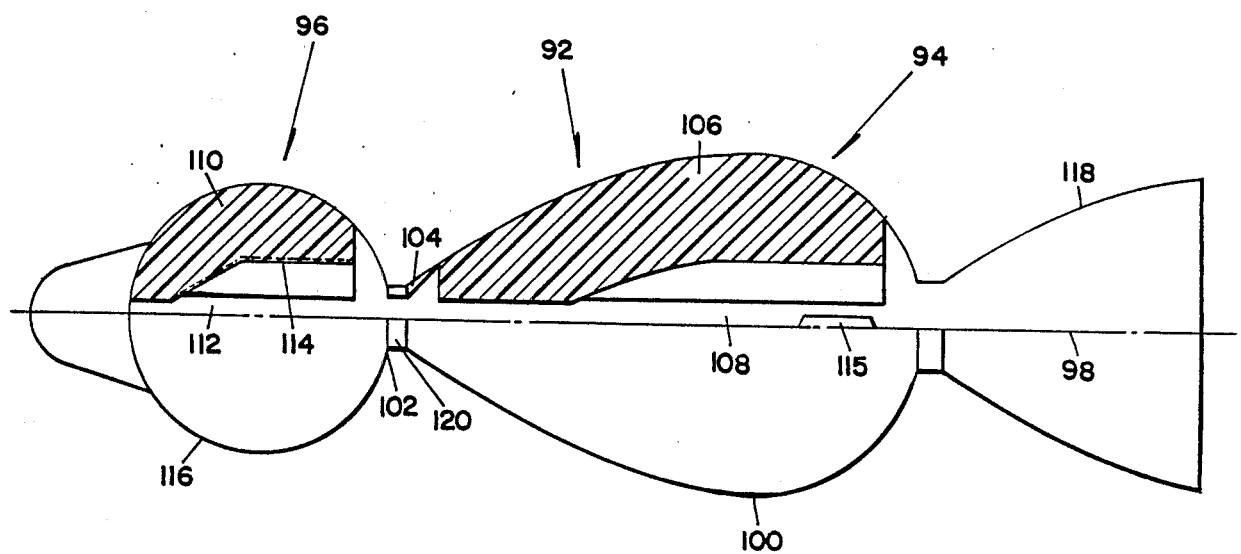
FIG. 4 is a cross sectional view of a further embodiment of the invention showing a stage-and-a-half rocket propulsion system with a non-submerged upper stage nozzle.

In FIG. 4 there is illustrated a modification of the embodiment of the invention shown in FIGS. 1 and 2. The modification shown in FIG. 4 comprises a stage-and-a-half propulsion system and differs from the propulsion system shown in FIGS. 1 and 2 in the use of a nonsubmerged second or upper stage nozzle. This difference results, as shown in the drawing, in the need for an extension of the length of both of the first and second stage cases along the longitudinal axis of the propulsion system.

Specifically, in the embodiment of FIG. 4, a rocket 92 includes a first stage rocket motor 94 that is attached to a second stage rocket motor 96. Motor 96 is positioned forward of motor 94, along the longitudinal axis 98 of rocket 92. Motor 94 includes a case 100 that is open at the forward end 102 thereof and is substantially continuous in form with a nozzle 104 of the second stage motor 96.

The first stage motor 94 includes a nozzle and a high burn rate solid propellant grain 106. Grain 106 has a center perforation forming a central combustion chamber 108. Similarly, the second stage motor 96 includes a solid propellant grain 110 that is a high burn rate propellant. Grain 110 includes a center perforation that forms a central combustion chamber 112 and, additionally, is covered by a layer 114 of slow burning rate material provided on the surface thus defining the central combustion chamber 112. As in the embodiment of FIGS. 1 and 2, the thickness of the layer 114 and the composition thereof are so arranged that upon operation of a single ignition subsystem 115, burning of the layer 114 lasts through substantially the entire burn of the first stage grain 106. This delays exposure of the second stage grain 110 until completion of the burn of the first stage grain 106.

As in the embodiments of FIGS. 1-3, gases generated by burning of the grain 106 pressurizes the central combustion chambers 108 and 112 and thus introduces tensile stresses in the case 100 of motor 94 and a case 116 in which motor 96 is enclosed. Flow of such gases through a nozzle 118 produce the desired first stage thrust.

Upon the completion of the burn of the grain 106, a stage separation device 120 is actuated for ejecting the first stage motor 94 from the rocket 92. Such separation is effected at the forward end 102 of case 100.

Hot gases in the central combustion chamber 112 of motor 96 ignite the exposed surface of grain 106. The generated gases that are produced maintain the pressurization of the central combustion chamber 112 for use as a source for secondary discharges and maintain also the tensile stress in the membranes of the wall of case 116. Additionally, such generated gases flow through the nozzle 104 to produce the desired second stage thrust.

Figure 5:
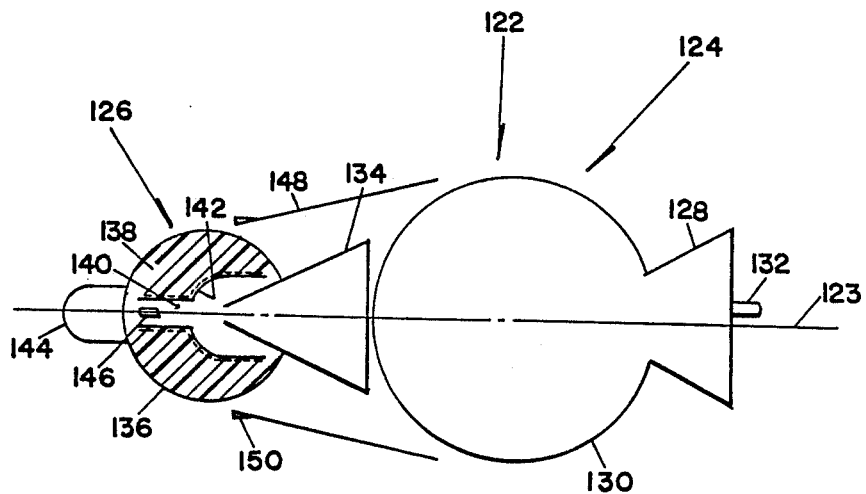
FIG. 5 is a partial sectional view showing the invention embodied in a conventional multi-stage system.

In FIG. 5, there is illustrated a partial sectional view showing the invention embodied in a conventional multi-stage rocket propulsion system. In FIG. 5, a rocket 122 having a longitudinal axis 123 comprises a first stage rocket motor 124 and a second stage rocket motor 126. Rocket motor 124 includes a nozzle 128 of the converging-diverging type attached to the aft end of a case 130. Contained within the case 130 is a propellant grain (not shown) which, desirably, may be a high burn rate and energetic propellant. This propellant grain may be perforated to form a central combustion chamber (not shown) therein. An igniter indicated at 132 is provided for igniting motor 124.

The second stage rocket motor includes a nozzle 134 of the converging-diverging type attached to the aft end of a case 136 having a solid propellant grain 138 therein. Grain 138 is a high burn rate propellant and has a center perforation therein forming a central combustion chamber 140. A layer 142 of slow burning rate material covers the surface of the grain 138 defining the central combustion chamber 140. As in the previous embodiments of the invention described, the layer 142 must burn away before the grain 138 is exposed for combustion. Attached to the forward end of case 136 is a forward dome 144. An igniter 146 is provided for igniting grain 138 of motor 126.

In FIG. 5, as shown, the peripheral surface of the case 136 of the second stage rocket motor 126 is connected to the peripheral surface of the case 130 of the first stage rocket motor 124 by an interstage or fairing 148. Upon completion of the burn of the first stage motor 124, the latter and the interstage 148 are ejected from the rocket 122 by actuation of a stage separation device 150. Such separation is effected at the line of attachment of the interstage 148 with the peripheral surface of the second stage case 136.

Although the maximum benefit of the invention is derived when used in combination with the stage-and-a-half or stage-and-two-halves arrangements illustrated in FIGS. 1-4, weight advantages still exist when the secondary discharge system is combined with a conventional propulsion system as shown in FIG. 5. In this arrangement, although a separate ignition system is used for each of the first and second stages, the second stage is pressurized and may be used as a source for secondary discharges while the first stage is burning.

It is inherent in the nature of multi-stage propulsion systems that the first or lower stages are more massive than the second or upper stages. Consequently, the vehicle center of gravity moves forward as propellant grain is burned and stages are ejected.

The present invention enables pitch, yaw and roll rotations of the vehicle during powered flight by the imposition of moments about the current center of gravity of the vehicle. This is accomplished through short duration discharges of gas from a forward position of the vehicle in any desired direction at a large angle from the vehicle axis. Particularly during lower stage operation, the small transverse thrusts from these discharges generate large moments about the vehicle current center of gravity because of the large distance to the current center of gravity. In this thrust vector control mode, the subsystem can be used either during space flight beyond the earth's atmosphere or at a lower altitude. During atmospheric flight, or while submerged under water, the subsystem can be used for boundary layer control to reduce flight friction by continuous or nearly continuous discharges in axisymmetric fashion at selected angular positions for additional thrust vector control.

The gas for such discharges, bled from a port at or near the center of the membrane of the forward dome 38 of the forward half stage motor 16 of the embodiment of FIGS. 1 and 2, for example, and routed through appropriate control valves, is the combustion product of the propellant then burning in the second stage motor 16, a portion of which is provided to achieve weight reductions of associated subsystems, as explained hereinbefore, rather than to furnish propulsion gases. The present invention eliminates the need for separate thrust vector control systems on each of the stages of the vehicle, and eliminates the need for or minimizes the size of separate propellant or gas charges and associated tankage that would otherwise be employed for thrust vector control and/or boundary layer control of the vehicle.

Thus, in accordance with the invention, there has been provided an improved method of and apparatus for so controlling the operation of a multi-stage rocket as to enable a reduction in weight of the rocket while achieving an increase in the useful energy available therefrom.

With this description of the invention in detail, those skilled in the art will appreciate that modifications may be made to the invention without departing from the spirit thereof. Therefore, it is not intended that the scope of the invention be limited to the specific embodiments illustrated and described. Rather, it is intended that the scope of the invention be determined by the scope of the appended claims.

What is claimed is:

1. A multi-stage rocket comprising,
 a lower stage rocket motor including a first nozzle and having a first solid propellant and a first case, said first solid propellant having a perforation therein forming a first central combustion chamber, said first case having a forward end and an aft end with said nozzle being attached to said aft end of said first case, at least a first upper stage rocket motor including a second nozzle and having a second solid propellant and a second case, said second solid propellant having a forward end and an aft end with said second case being open at the aft end of said second solid propellant and attached to said second nozzle, said second solid propellant having a perforation therein forming a second central combustion chamber with a first layer of slow burning material covering the surface defining said second central combustion chamber, and ignition means provided in operative association with said first and second combustion chambers and operative when activated, to ignite said propellants in said lower and upper stages approximately simultaneously, the burn rate and thickness of said slow burning material covering the surface defining said second central combustion chamber being arranged so that, upon operation of said ignition means, burning of said slow burning material lasts through substantially the entire burn of said first solid propellant and delays for a corresponding period exposure of the surface defining said second central combustion chamber and thereby burning of said second solid propellant, whereby said upper stage at least is pressurized during burning of said first solid propellant, such pressurization reducing compressive stresses in said second case induced by transmission of lower stage thrust to forward portions of the rocket by superimposing counteracting tensile stresses therein, and additionally providing a source for the secondary discharge of gas during burning of said first solid propellant.

2. A multi-stage rocket as defined by claim 1 wherein said first solid propellant includes a perforation that forms a first central combustion chamber therein.

3. A multi-stage rocket as defined by claim 2 further including, means to eject said lower stage upon completion of the burn of said first solid propellant.

4. A multi-stage rocket as defined by claim 2, wherein ignition of said lower and said first upper stage is accomplished approximately simultaneously through operation of a single ignition means.

5. A multi-stage rocket as defined by claim 4 wherein the forward end of said first case is open and said second case at the open aft end thereof forms a continuation of the open end of said first case.

6. A multi-stage rocket motor as defined by claim 5 further including means to eject said lower stage upon completion of the burn of said first solid propellant.

7. A multi-stage rocket motor as defined by claim 2 wherein said second case is open at the forward end of said second solid propellant, and further including, at least one additional upper stage having a third solid propellant and a third case, said third solid propellant having a forward end and an aft end with said third case being open at the aft end of said third solid propellant, said third solid propellant having a perforation therein forming a third central combustion chamber therein and including a second layer of slow burning material covering the surface defining said third central combustion chamber, the burn rate and thickness of said second layer of slow burning material being arranged so that burning thereof lasts through substantially the entire burn of said first solid propellant and the entire burn of said second solid propellant and thereby delays for a corresponding period exposure of said third solid propellant, and hence, burning thereof, whereby said additional upper stage also is pressurized during burning of said first and second solid propellants, such pressurization during burning of said first and second solid propellants contributing to the reduction of compressive stresses in all of said cases induced by transmission of lower stage thrust by superimposing tensile stresses therein, and additionally, providing a source for the secondary discharge of gas.

8. A multi-stage rocket motor as defined by claim 7 further including, means to eject said lower stage upon completion of the burn of said first solid propellant, and means to eject said first upper stage upon completion of the burn of said second solid propellant.

9. A multi-stage rocket motor as defined by claim 8, wherein said first upper stage nozzle forms a continuation of the open end of said first case, and wherein said third case includes a second upper stage nozzle at the aft end of said third solid propellant, said second upper stage nozzle forming a continuation of the forward open end of said second case.

10. A multi-stage rocket motor as defined by claim 8, wherein ignition of all of said stages is accomplished approximately simultaneously through operation of a single ignition means.

11. A multi-stage rocket motor as defined by claim 10 wherein said second case forms a continuation of the open end of said first case.

12. A multi-stage rocket motor as defined by claim 11 wherein said third case forms a continuation of the forward open end of said second case.

13. A multi-stage rocket motor as defined by claim 12 further including, first means to eject said lower stage upon completion of the burn of said first propellant, and second means to eject said first upper stage upon completion of the burn of said second propellant.

* * * * *